United States Patent
Ehrman et al.

(10) Patent No.: US 6,899,119 B2
(45) Date of Patent: May 31, 2005

(54) FILLING VALVE

(75) Inventors: Moshe Ehrman, Halutza (IL); Udi Orenstein, Halutza (IL); Zohar Moalem, Halutza (IL); Yoav Livne, Halutza (IL); Vladimir Olshanetsky, Beer Sheva (IL)

(73) Assignee: Raval-Agriculture Cooperative Societies Ltd., Halutza (IL)

( * ) Notice: Subject to any disclaimer, the term of this patent is extended or adjusted under 35 U.S.C. 154(b) by 0 days.

(21) Appl. No.: 10/203,798

(22) PCT Filed: Feb. 14, 2001

(86) PCT No.: PCT/IL01/00141

§ 371 (c)(1),
(2), (4) Date: Nov. 12, 2002

(87) PCT Pub. No.: WO01/59339

PCT Pub. Date: Aug. 16, 2001

(65) Prior Publication Data

US 2003/0136444 A1 Jul. 24, 2003

(30) Foreign Application Priority Data

Feb. 14, 2000 (IL) .................................................. 134535

(51) Int. Cl.⁷ .............................................. F16K 24/04
(52) U.S. Cl. ......................................... 137/202; 137/43
(58) Field of Search .................................... 137/43, 202

(56) References Cited

U.S. PATENT DOCUMENTS

| 5,172,714 A | 12/1992 | Kobayashi et al. |
| 5,762,090 A | 6/1998 | Halamish et al. |
| 6,701,952 B1 * | 3/2004 | Ehrman et al. ............. 137/202 |

FOREIGN PATENT DOCUMENTS

| GB | 2269375 A * | 2/1994 |
| JP | 59-034932 A | 2/1984 |
| JP | 04-201718 A | 7/1992 |
| WO | WO 01/07806 A1 | 2/2001 |

* cited by examiner

Primary Examiner—Gerald A. Michalsky
(74) Attorney, Agent, or Firm—Birch, Stewart, Kolasch & Birch, LLP (57) ABSTRACT

A valve comprising a housing defining a control space with an outlet port for fluid egress from the space and at least one inlet port for fluid ingress into the space control member is displaceable between an open state in which the outlet port is open and a closed state in which the outlet port is closed. The at least one inlet port of the at least one inlet port is formed at a wall portion of the housing at an upper wall portion, and a fluid draining port is formed at or adjacent a bottom end of the housing for draining fluid from the control space. The fluid draining port serves for preventing fluid ingress into the control space.

18 Claims, 5 Drawing Sheets

FIG. 6B ated, shut down a fuel filling process only when the fuel has reached a maximum level within the tank, i.e. leaving a minimal "dead space" within the tank.

FILLING VALVE

This application is the national phase under 35 U.S.C. § 371 of PCT International Application No. PCT/IL01/00141 which has an International filing date of Feb. 14, 2001, which designated the United States of America.

FIELD OF THE INVENTION

The present invention is generally in the field of fuel valves and more specifically it is concerned with improving such valves wherein the filling level in a vehicle's fuel tank is maximized.

BACKGROUND OF THE INVENTION

It has always been a desired object among vehicle manufacturers and designers to provide vehicle fuel tanks with interruption valves which on the one hand function as per their intended purpose (e.g. roll-over valve, venting valve, over filling interdiction valve, vapor recovery valve, separator valve, etc.) whilst, on the other hand, shut down a fuel filling process only when the fuel has reached a maximum level within the tank, i.e. leaving a minimal "dead space" within the tank.

The term "dead space" refers to a volume of the fuel tank which remains empty when the tank is filled at a maximum level. The term "buoyancy level" denotes the level at which a control member within the valve (typically a buoy member) displaces from an open position to a closed position in which an outlet port of the valve closes, thereby shutting off the filling process.

The fuel filling process is normally terminated when the liquid reaches the buoyancy level within the tank, whereby the control member within the valve displaces into a closed, sealing position so as to seal an outlet of the valve, resulting in pressure rise within the tank and fuel rising within a fuel pipe of the tank whereby a filling spout fitted with an automatic shut-off sensor ceases the fuel flow into the tank as known per se.

On the other hand, there is an increasing demand for designing fuel tanks which require minimal overhead space of the vehicle, namely with minimal projections extending from surfaces of the tank and with maximum ratio of tank volume versus filling capacity. For that purpose, there have been designed suitable fuel valves which are received within the fuel tank. Such valves however, significantly project into the fuel tank, as compared with conventional valves, having a relatively low buoyancy level, thereby shutting off a fueling process at an earlier stage as compared with fuel valves projecting above the fuel tank.

It is an object of the present invention to provide a fuel valve wherein the shut-oft level is significantly higher as compared with prior art valves and extends substantially adjacent a top wall of the tank, thereby reducing the dead space to a minimum, without interfering with the valve's function.

SUMMARY OF THE INVENTION

According to the present invention there is provided a valve comprising a housing defining a control space with an outlet port for fluid egress from said space and at least one inlet port for fluid ingress into said space; and a displaceable control member displaceable between an open state in which the outlet port is open and a closed state in which said outlet port is closed;

the valve characterized in that:

the at least one inlet port of said at least one inlet port is formed at a wall portion of the housing at an upper wall portion, and a liquid draining port is formed at or adjacent a bottom end of the housing for draining liquid from said space, said liquid draining port preventing liquid ingress into the control space.

The arrangement is such that in its assembled position within the tank, the level of the at least one inlet port defines a maximum filling level of the tank and thus extends adjacent a top wall portion of the tank.

The control member displaces into its open state upon liquid egress from the housing via said draining port.

The draining port is adapted for allowing vapor flow from the tank into the control space, while liquid flow in that direction only is prohibited. This arrangement constitutes a liquid one way valve. By one particular embodiment the draining port comprises a liquid-responsive closure member which closes the draining port to prevent liquid ingress into the control space. By still a particular example, the draining port is formed with a flow path, and the liquid-responsive closure member is a float member displaceable between an open position in which the flow path is open, and a closed position in which the flow path is closed.

By another particular embodiment, the liquid-responsive closure member is a flexible member displaceable between an open position in which the draining port is open and a closed position in which the draining port is closed so as to prevent egress of liquid from the space.

As a different alternative, the liquid-responsive closure member is a spring-biased door member which is normally biased into its closed position by spring means. The mass of the liquid within the control space causes the door member to momentarily displace from its normally closed and sealed position into its open position, discharging the liquid into the fuel tank. Fluid ingress into the control chamber via the closure member is prevented.

By a particular embodiment of the invention, the valve extends within the tank from a top wall portion thereof, wherein the at least one inlet port is formed at an upper portion of the wall of the housing adjacent said upper wall portion of the tank.

The arrangement in accordance with the invention is such that when liquid enters the housing via said at least one inlet port, it entails displacement of the control member into its closed state, where said control member displaces into its open state upon draining of the housing via the draining port.

In accordance with a modification of the invention there is provided a valve for attaching at a top wall portion of a tank, said valve comprising a housing formed with an outlet port for fluid egress with a control member adapted for selectively closing and opening said outlet port responsive to liquid level within the housing; a liquid inlet port formed at said housing adjacent the top wall of the tank, and a draining inlet port formed at said housing adjacent the top wall of the tank, and a draining port at a bottom portion of the housing for liquid egress from said housing and to prevent liquid ingress into the housing.

The arrangement is such that a control member opens the outlet port when liquid egresses from the housing via the draining port (after liquid level has descended in the tank).

In accordance with an embodiment of the invention, the valve extends within the tank from a top wall portion thereof, whereby the at least one inlet port is formed at an upper portion of the wall of the housing adjacent said upper wall portion of the tank.

BRIEF DESCRIPTION OF THE DRAWINGS

For better understanding the invention and to see how it may be carried out in practice, the invention will now be described, by way of example only, with reference to the accompanying drawings, in which:

FIG. 5A illustrates a different embodiment of the present invention fitted with a one-way draining valve; wherein

BRIEF DESCRIPTION OF PREFERRED EMBODIMENTS

Attention is first directed to FIGS. 1A–1D of the drawings illustrating a first embodiment in accordance with the present invention. The valve, generally designated 10 is entirely received within a fuel tank and extends from a top wall portion 14 thereof. However, it will be appreciated that the valve 10 may be of any design serving as one or more of a roll-over valve (ROV), over-filling interdiction valve (OFI), filling-limit vent-valve (FLVV), etc.

The valve 10 is attached to wall portion 14 by means of portion 16 extending through an opening 18 formed in the wall with a cover portion 20 for ensuring tight sealing of the fuel tank, i.e. liquid/vapor impermeability.

The valve 10 has a cylindrical housing 24 defining a control space 26. Control space 26 is formed at an upper end thereof with an outlet port 30 extending into an outlet nozzle 34. Housing 24 is formed at an upper portion thereof with an inlet port 36 (only one seen although, more than one are possible) defining a flow communication path between the interior of the tank and the control space 26. A control member support wall 27 is formed with one or more apertures 28 for improved flow communication.

Formed at a bottom of the housing 24 there is a draining port 40 for drainage of control space 26 into the fuel tank. Draining port 40 is governed by a float member 42 displaceable between an open position (FIGS. 1A and 1D) and a closed position (FIGS. 1B and 1C) responsive to liquid level within the fuel tank.

Extending above float member 42 there is a control member 46 displaceable between an open state (FIGS. 1A, 1B and 1D) in which the outlet port 30 is open, and a closed position (FIG. 1C) in which the outlet port 30 is sealed by an upper surface 48 of the control member 46. It is noted that control member 46 is biased by a coiled spring 50 for assisting the control member 46 to displace into its closed state (FIG. 1C).

Figure 1A:
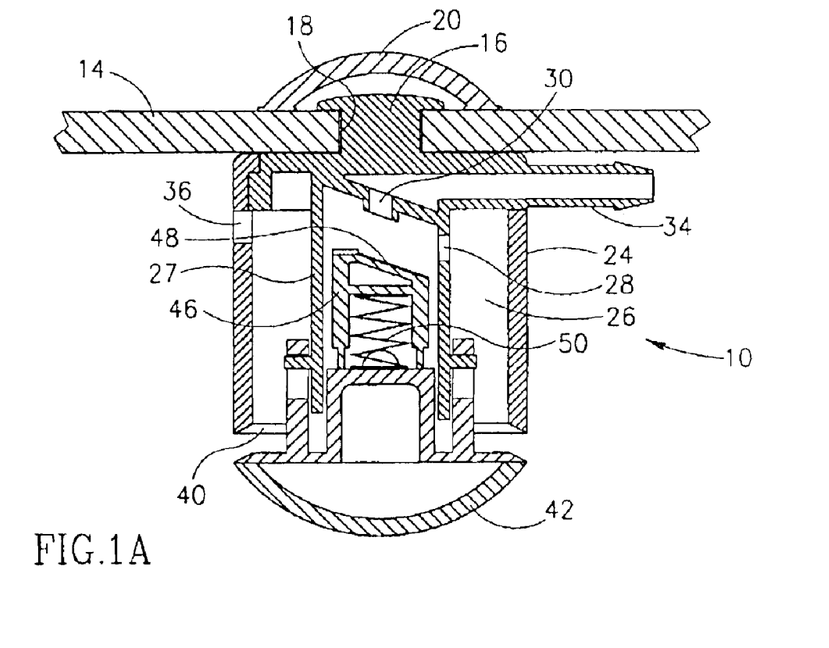
FIGS. 1A–1D are sectional views illustrating four consecutive stages of filling process utilizing a valve in accordance with the present invention, fitted in a fuel tank.

The arrangement is such that when liquid in the fuel tank is below the buoyancy level of float member 42 the latter is in its open state as seen in FIG. 1A. In this position, fuel vapor (not liquid) may also be removed from the fuel tank via the draining port. However, during a fueling process, liquid level within the fuel tank raises to the position seen in FIG. 1B wherein float member 42 is displaced into its closed position, sealing the draining port 40. In this state, the outlet port 30 still remains open whereby fuel vapor continues to egress via nozzle 34, as long as filling process continues.

Figure 1B:
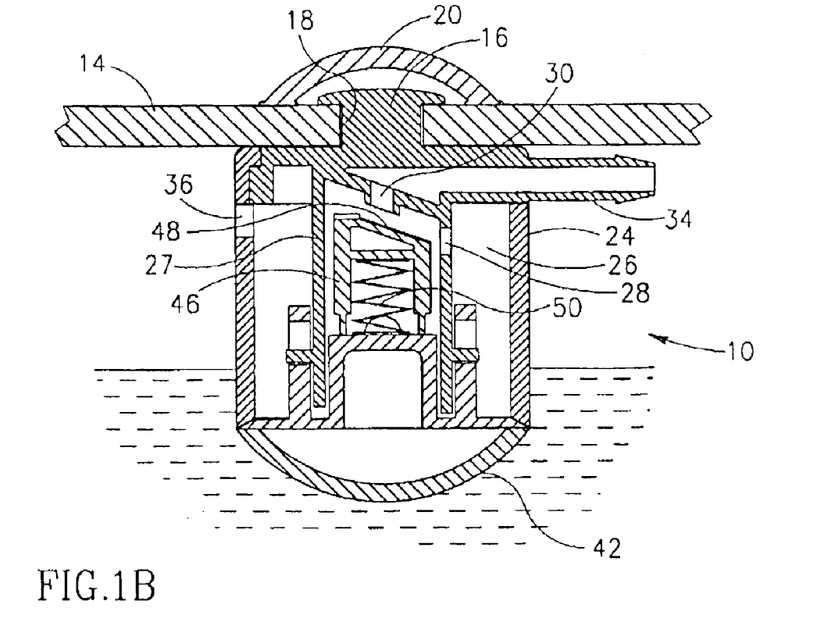
Figure 1C:
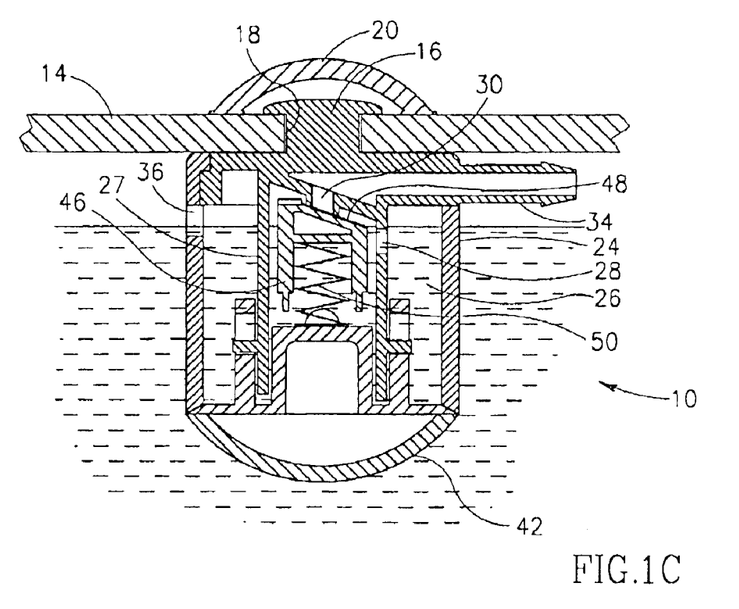
Figure 1D:
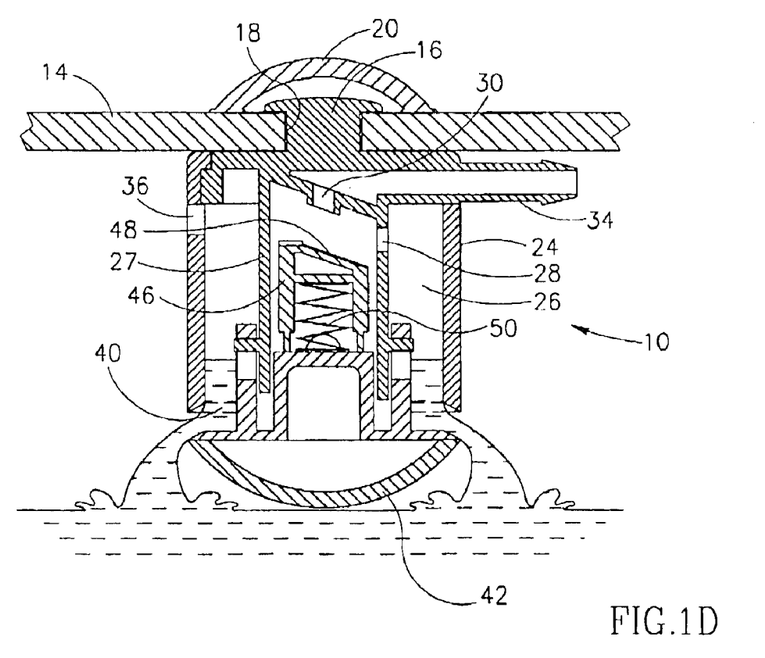

When liquid level reaches the position seen in FIG. 1C leaving a minimal dead space if at all, it enters the control space 26 via inlet port 36 giving rise to displacement of control member 46 into its closed position, thus sealing outlet port 30. At this stage the filling process terminates by a cut-off mechanism associated with a fuel-filling spout as known per se, as a result of resistance sensed at the fueling spout.

As fuel level within the tank drops below the buoyancy level of float member 42, the latter displaces into its open position (FIG. 1D) whereby control space 26 drains through draining port 40. This entails displacement of control member 46 into its open position whereby the fuel tank is again vented through outlet port 30. It is appreciated that during traveling of the vehicle, the control member displaces within the control space responsive to liquid, as known per se without interfering with the designated functioning of the valve.

Figure 2:
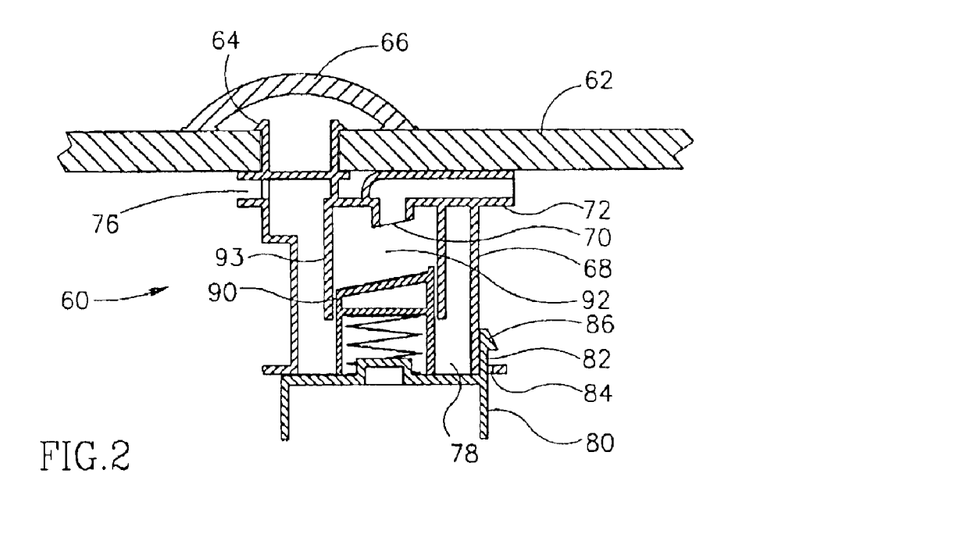
FIG. 2 is a sectional view illustrating a different embodiment of a valve in accordance with the present invention.

Further attention is now directed to FIG. 2 of the drawings illustrating a modification of the embodiment seen in FIG. 1 wherein the valve generally designated 60 is attached to the top wall portion 62 of the tank in a snap-type manner at 64 with a sealing cover 66, similar to the cover 20 in the previous embodiment. Housing 68 is integrally formed with an outlet port 70 extending into an outlet nozzle 72, an inlet port 76 formed at an uppermost portion of the housing 68, adjacent the top wall portion 62 of the fuel tank and a draining port 78 closeable by a closing member 80 displaceable between an open position (not shown) and a closed position as in FIG. 2, responsive to liquid level within the fuel tank.

Downward displacement of closing member 80 is restricted by means of lugs 82 displaceable within openings 84 formed in housing 68 with an expanded portion 86 restricting further downward displacement.

Mounted on an upper surface of closing member 80 there is a control member 90 displaceable within control space 92 between a closed position in which it sealingly closes outlet port 70 (this position is not illustrated) and an open position in which outlet port 70 is open, as seen in FIG. 2. Radially extending support ribs 93 support the control member 90 during its displacing motion. It is also noted that closing member 80 is an open type float member responsive to liquid level.

The operation of the valve illustrated in FIG. 2 is similar to the sequence of operation shown in FIGS. 1A through 1D and the reader is referred to the relevant portions above.

Figure 3:
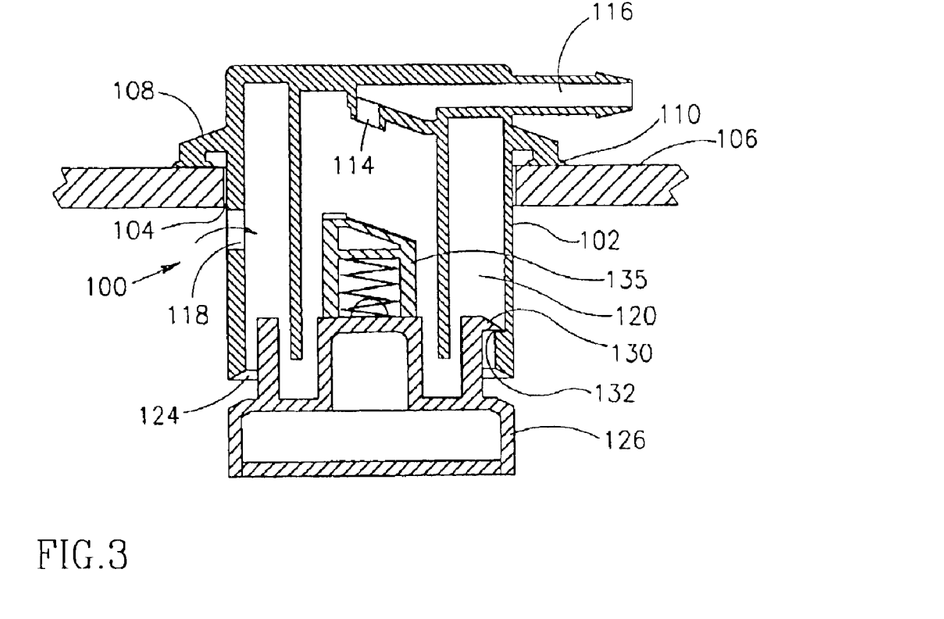
FIG. 3 is a sectional view of a valve in accordance with still a further embodiment, wherein the valve partially projects from a top wall of the fuel tank.

Whilst in the embodiments of FIGS. 1 and 2 the valve member was entirely received within the tank, in accordance with the embodiment of FIG. 3, there is provided a valve generally designated 100 having a housing 102 extending through a large opening 104 of a top wall 106 of the tank, where the valve 100 is secured to the wall portion 106 by a circumferential flange 108 welded at 110 thereto.

Similar to the previous embodiments, housing 102 is formed with an outlet port 114 being in flow communication with an outlet nozzle 116 extending above the top wall surface 106 and an inlet port 118 formed right below the bottom surface of top wall portion 106 for liquid ingress into the control space 120 of valve 100.

A draining port 124 is formed at a bottom end of housing 102 with a float member 126 being articulated at a bottom end of the housing and being displaceable between an open position as in FIG. 3 and a closed position (not shown) in which it closes the draining port 124 as a result of buoyancy forces imparted thereto by fuel level rising within the tank as explained in connection with FIG. 1B above. Downward displacement of the float member 126 is restricted by means of tooth 130 engageable with a corresponding shoulder portion 132 of housing 102.

Extending above float member 126 there is a float control member 135 displaceable between an open position as in FIG. 3, wherein outlet port 114 is vented, and a closed position (not shown) wherein the float control member bears against a corresponding surface of outlet port 114, sealingly closing the outlet.

Here again, the reader is directed to the description of FIGS. 1A through 1D for understanding how the valve operates.

Figure 4:
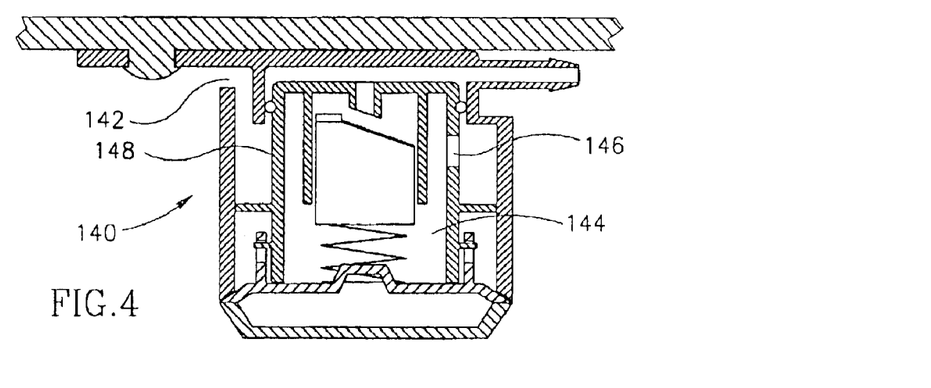
FIG. 4 illustrates still another embodiment of the present invention.

The embodiment of FIG. 4 is still another example of a valve 140 in accordance with the present invention. Valve 140 is attached at a bottom surface of the top wall of the fuel tank and depends from a stud formed in the wall. Principally the valve of FIG. 4 is similar to the embodiment of FIG. 1 with the major difference residing in the location of inlet port 142 and the flow communication of the inlet port 142 with the control space 144 of the valve which is through an inlet aperture 146 formed at an inner wall portion 148 which is part of the housing. This arrangement is useful in particular for dampening hammering effects of the valve.

Other components of the valve are essentially similar to the previous embodiments as well as the general operation of the valve.

Figure 5A:
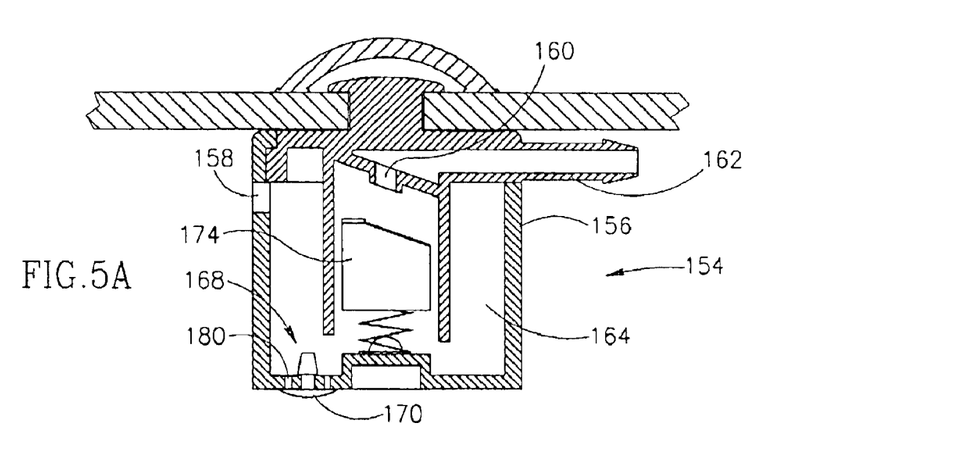
Figure 5B:
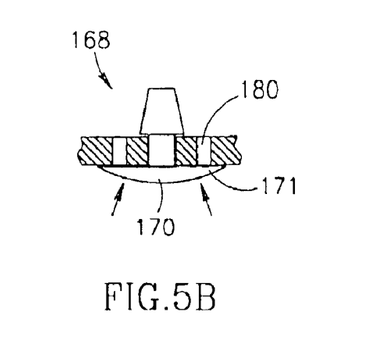
FIGS. 5B and 5C are partial enlarged views illustrating the one-way draining valve illustrated in FIG. 5A in a closed and open position, respectively.
Figure 5C:
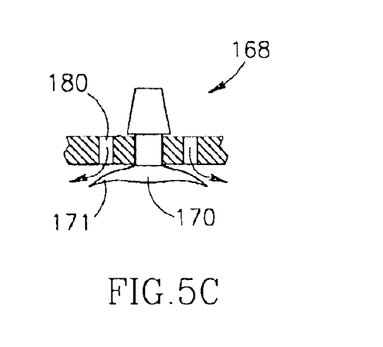

Turning now to FIG. 5A there is illustrated a valve generally designated 154 which comprises a housing 156 formed at an upper end thereof with an inlet port 158, an outlet port 160 being in flow communication with outlet nozzle 162, a control space 164 with a draining port generally designated 168 sealable by a mushroom-type seal member 170 (see enlarged FIGS. 5B and 5C).

Displaceable within control space 164 there is a control float member 174 displaceable between an open position (as in FIG. 5A) wherein control space 164 and thus the interior of the fuel tank are vented through outer port 160, and a closed state (not shown) wherein float control member 174 sealingly bears against a corresponding surface of outlet port 160, as described hereinabove with reference to the preceding embodiments.

The present embodiment differs from the previous embodiments in that rather than a float member displaceably closing or opening the draining port responsive to fluid liquid within the fuel tank, there is formed a one-way type valve wherein a bottom wall surface of the housing 156 is formed with several outlet apertures 180 normally sealed by peripheral edges of a flexible rubber mushroom-shaped seal member 170. In the normal state of operation, when liquid in the fuel tank is below or above the level of the draining port 168, the apertures 180 are sealed by peripheral portions of the flexible seal member 170. However, once liquid level within the tank raises above level of inlet port 158 (corresponding with the position of FIG. 1C) liquid enters the control space 164 resulting in displacement of control member 174 into its closed space. However, when liquid within the fuel tank drops below the level of draining port 168, liquid pressure within the control space 164 imparts some pressure on the peripheral portions of the mushroom-shaped seal member 170, resulting in its deformation as shown in FIG. 5C, allowing draining of liquid through outlet openings 180, allowing the control member 174 to displace back into its open position. It is appreciated however, that other types of one-way valves may be utilized for that purpose.

Figure 6A:
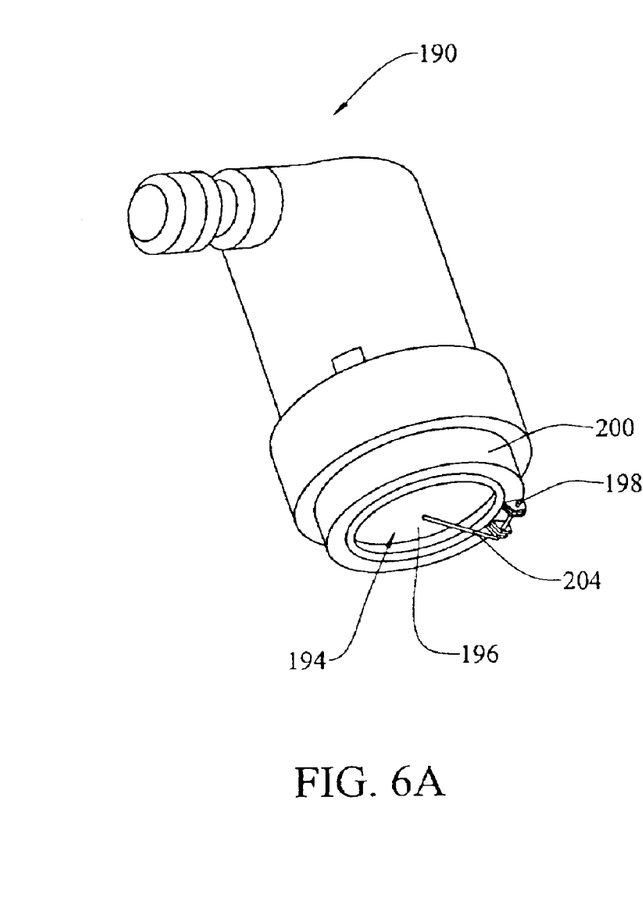
FIGS. 6A and 6B illustrate an embodiment of the present invention wherein the valve is fitted with a door-like closure member, in its normally closed and sealed position and in its open position, respectively.
Figure 6B:
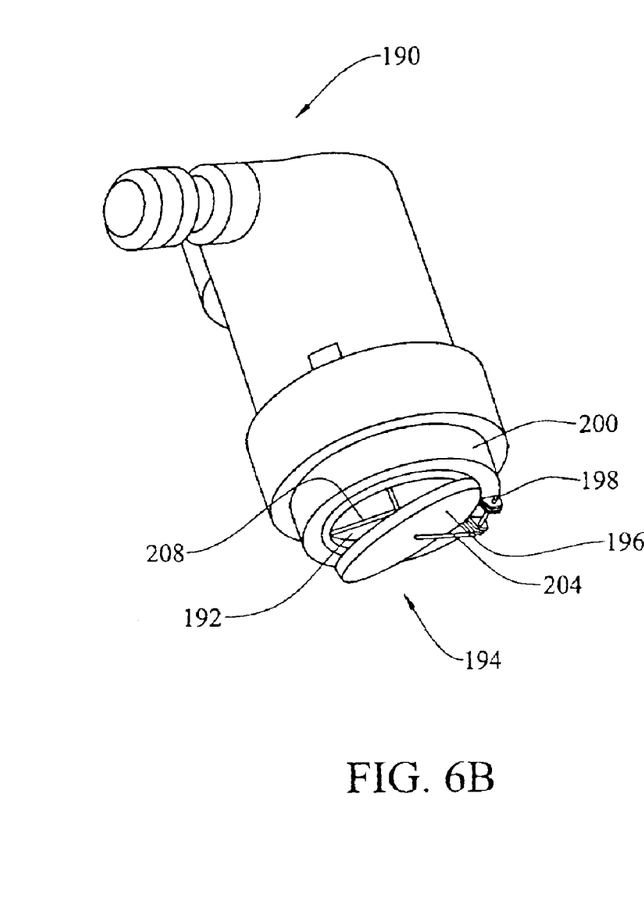

Further attention is now directed to FIGS. 6A and 6B in which the valve 190 which is principally similar in construction and operation with the previous embodiment disclosed in connection with FIGS. 5A–5C, the significant difference residing in the construction of the draining port 192 (FIG. 6B) which is fitted with a one-way door-type valve assembly 194. Door assembly comprises a door member 196 pivotally connected at 198 to a lower portion 200 of the housing of the valve. The door 196 is biased by spring 204 into its closed and sealed position, as in FIG. 6A.

The arrangement is such that above the draining port 192 there is provided a ribbed seating 208 for supporting the flow control member and its spring (not shown).

Operation of the valve in accordance with this embodiment is principally similar to the disclosure of the previous embodiment referred to in FIGS. 5A–5C with the exception that the door 196 displaces from its closed and sealed position of FIG. 6A to its open position of FIG. 6B by means of pressure within the control chamber of the valve or by means of a mass of fuel liquid bearing on the door 196 which momentarily causes it to displace into the open position. The remaining features of the valve remain as disclosed and explained hereinabove.

Whilst preferred embodiments have been shown and described, it is to be understood that it is not intended thereby to limit the disclosure of the invention, but rather it is intended to cover all modifications and arrangements falling within the spirit and the scope of the invention, mutatis mutandis.

What is claimed is:

1. A valve associated with a fuel tank in which above the level of liquid in the tank is a vapor fluid, said valve comprising a housing defining a control space having intercommunicating ports with an outlet port for fluid egress from said control space, at least one inlet port for fluid ingress into said control space and a liquid draining port; and a displaceable control member displaceable between an open state in which said outlet port is open and a closed state in which said outlet port is closed;

the valve characterized in that:

the at least one inlet port is formed in an outer lateral wall of the housing, said at least one inlet port being located at an upper part of the outer lateral wall portion, and said fluid draining port is formed at or adjacent a bottom end of the housing for draining fluid from said space, said fluid draining port preventing fluid ingress into the control space; said draining port being closeable by means responsive to the level of fluid in the tank, the arrangement being such that when the level of fluid in the tank is lower than the at least one inlet port, said control member rests on said means responsive to the level of fluid in the tank.

2. A valve according to claim 1 for fitting in a tank, wherein the level of the inlet port defines a maximum filling level of the tank.

3. A valve according to claim 1, wherein said draining port comprises one or more one way valves.

4. A valve according to claim 1, wherein the draining port comprises a fluid-responsive closure member which closes the draining port to prevent fluid ingress into the control space.

5. A valve according to claim 4, wherein the draining port is formed with a flow path, and the fluid-responsive closure member is a float member displaceable between an open position in which the flow path is open, and a closed position in which the flow path is closed.

6. A valve according to claim 4, wherein the liquid-responsive closure member is a flexible member displaceable between an open position in which the draining port is open and a closed position in which the draining port is closed so as to prevent egress of liquid from the space.

7. A valve according to claim 4, wherein the liquid-responsive closure member is a door-type valve normally biased into a closed position in which the draining port is closed so as to prevent egress of liquid from the space, and an open position in which the draining port is momentarily opened to discharge the control space into the tank.

8. A valve according to claim 1, wherein the control member displaces to its open state when fluid egresses from the housing via the draining port.

9. A valve according to claim 1, wherein the valve extends within the tank from a top wall portion thereof, whereby the at least one inlet port is formed at an upper portion of the wall of the housing adjacent said upper wall portion of the tank.

10. A valve member according to claim 1, wherein fluid entering said housing via said inlet port entails displacement of the control member into its closed state, and where said control member displaces to its open state upon draining of the housing via the draining port.

11. A valve according to claim 1, wherein the draining port is fluid responsive and closes upon sensing liquid out of the housing.

12. A valve for attaching at a top wall portion of a tank, said valve comprising a housing formed with an outlet port for fluid egress with a control member adapted for selectively closing and opening said outlet port responsive to fluid level within the housing; an inlet port formed at said housing adjacent the top wall of the tank, and a draining port at a bottom portion of the housing for fluid egress from said housing and to prevent fluid ingress into the housing and said draining port being closeable by a means responsive to the level of fluid in the tank, the arrangement being such that when the level of fluid in the tank is lower than the inlet port, said control member rests on said means responsive to the level of fluid in the tank.

13. A valve according to claim 12, wherein the control member opens the outlet port when fluid egresses from the housing via the draining port.

14. A valve according to claim 12, wherein fluid entering said housing via said inlet port entails displacement of the control member into closing the outlet port, and where said control member displaces to open said outlet port upon draining of the housing via the draining port.

15. A valve according to claim 12, wherein the valve extends within the tank from a top wall portion thereof, whereby the at least one inlet port is formed at an upper portion of the wall of the housing adjacent said upper wall portion of the tank.

16. A valve according to claim 12, wherein the draining port is fluid responsive and closes upon sensing fluid out of the housing.

17. A valve according to claim 16, wherein the draining port closes to prevent fluid ingress into the housing and opens to drain the housing when fluid level in the tank drops bellow the ingress port.

18. A valve according to claim 17 wherein the draining port is fitted with a door-type one-way valve member which is normally biased into a closed position preventing egress of fluid into the control space.

* * * * *

UNITED STATES PATENT AND TRADEMARK OFFICE
CERTIFICATE OF CORRECTION

PATENT NO. : 6,899,119 B2
DATED : May 31, 2005
INVENTOR(S) : Moshe Ehrman et al.

It is certified that error appears in the above-identified patent and that said Letters Patent is hereby corrected as shown below:

<u>Title page,</u>
Item [54], Title, should read as follows:
-- IMPROVED FILLING VALVE --.

Signed and Sealed this

Eighth Day of November, 2005

JON W. DUDAS
*Director of the United States Patent and Trademark Office*